United States Patent [19]
Kodera et al.

[11] Patent Number: 6,089,219
[45] Date of Patent: Jul. 18, 2000

[54] GAS BURNER FOR COOKING STOVE

[75] Inventors: Hiroshi Kodera, Kashihara; Yuzuru Uchida, Sakai; Takashi Ohta, Osaka; Hiroshi Kamitani, Hirakata, all of Japan

[73] Assignee: Harman Co., Ltd., Japan

[21] Appl. No.: 09/341,380

[22] PCT Filed: Jan. 16, 1998

[86] PCT No.: PCT/JP98/00161

§ 371 Date: Jul. 9, 1999

§ 102(e) Date: Jul. 9, 1999

[87] PCT Pub. No.: WO98/31967

PCT Pub. Date: Jul. 23, 1998

[30] Foreign Application Priority Data

Jan. 20, 1997 [JP] Japan ......................................... 9-7298

[51] Int. Cl.[7] ....................................................... F24C 3/00
[52] U.S. Cl. ...................... 126/39 R; 126/39 H; 239/558; 239/559
[58] Field of Search ............................... 126/39 R, 39 H, 126/39 N; 239/558, 559, 567

[56] References Cited

U.S. PATENT DOCUMENTS 5,002,038  3/1991  Riehl ...................................... 126/39 R
5,133,658  7/1992  Le Monnier De Gouville et al. .... 239/567

FOREIGN PATENT DOCUMENTS 336418  2/1991  Japan .
552519  7/1993  Japan .
561614  8/1993  Japan .

*Primary Examiner*—Carroll Dority
*Attorney, Agent, or Firm*—Webb Ziesenheim Logsdon Orkin & Hanson, P.C.

[57] ABSTRACT

This application is an invention relating to an improvement in a gas burner for a stove for leading a mixed gas to flame holes, and burning the gas therein, through a gas passage (18) from a mixing tube (5) which produces the mixed gas by mixing a gas introduced in a jet from a nozzle and primary air drawn in with introduction of the gas. A sub-chamber (Ca) is provided separately from the gas passage for storing the mixed gas in a state of flux. The sub-chamber (Ca) communicates with the gas passage (18) through an inlet (3), and discharges the mixed gas stored therein through outlets (2) disposed adjacent the flame holes. With this construction, even when a continued combustion in the flame holes becomes difficult due to air-rich air resulting from an operation of an adjusting lever of the gas burner for a stove to adjusts the quantity of gas rapidly from large to small, the mixed gas stored in the sub-chamber (Ca) is discharged from the outlets (2) to continue the combustion.

6 Claims, 4 Drawing Sheets

GAS BURNER FOR COOKING STOVE

BACKGROUND OF THE INVENTION

1. Field of the Invention

This invention relates to a gas burner for a stove, and more particularly to a design for avoiding, by means of a simple construction, an extinguishment occurring when the quantity of gas is reduced rapidly from large fire to small fire.

2. Description of the Prior Art

Conventionally, an ordinary gas burner for a stove can adjust the quantity of gas from a large fire of about 2,700–4,000 kcal/h to a small fire of about 300–450 kcal/h. In a gas burner for a stove, air corresponding to the quantity of gas spouting from a nozzle is drawn by an ejector pump action caused by a flow velocity of the gas spouting from the nozzle. Primary air (about 50% of theoretical air) necessary for combustion is drawn. Thus, in a state of large fire, a large quantity of primary air is drawn according to the quantity of gas.

In adjusting heating power to a small fire from the state of large fire in which a large quantity of primary air is drawn as noted above, the quantity of gas is instantaneously reduced to a state of small fire. The flow of primary air drawn in the state of large fire itself has an inertial action. When the quantity of gas is reduced rapidly, the primary air changes with a delay after the instantaneous change in the quantity of gas, whereby the primary air momentarily becomes excessive. In such an air rich state, combustion cannot be continued. There has been a problem that the fire goes out.

To solve such a problem, as in Patent Laying-Open Publication H3-36418 shown in FIG. 6, a diaphragm 8 is provided at a forward end of a branch passage 7 branched from a gas passage 13 extending to a nozzle 6 for jetting gas into a mixing tube 55, to form an expansion/contraction chamber 9 which expands and contracts under gas pressures transmitted. When throttled from a state of large fire to a state of small fire, the expansion/contraction chamber 9 expands as a result of a pressure drop, to push the gas stored through the branch passage 7 out to the gas passage 13, thereby to compensate for a lack in the gas flow rate due to the rapid throttle-down. Numeral 30 in the drawing denotes a valve for adjusting the quantity of gas.

However, such a construction additionally requires movable parts such as the diaphragm 8 and a balancing spring 10 for supporting the diaphragm 8. The balancing spring 10 must be incorporated with predetermined precision. The construction and assembly are complicated. As another device, though not shown in the drawings, a curved path in the shape of letter L is formed in a control path of a control lever for adjusting the quantity of gas, so that the control lever cannot move from a large fire position to a small fire position at a stroke. However, this construction requires the approximately L-shaped curved path in the control path. Moreover a control side including the control lever needs a construction corresponding to the movement of the control lever moving through the curved path. Thus, the construction is complicated.

As a further device, a damper for adjusting primary air for a burner is turned in response to a movement of a control lever for adjusting the quantity of gas. In time of throttling to a state of small fire, the quantity of primary air also is throttled down. However, such a construction requires the damper to be pivotable, and a complicated structure for its interlocking with the control lever, which lowers assembling facility.

Thus, the prior art has the problems of requiring movable parts, and of complicated construction and assembly, high cost and low productivity.

SUMMARY OF THE INVENTION

This invention intends to solve such problems, and its object is to provide a gas burner for a stove which has a simple construction for avoiding extinguishment when the quantity of gas is reduced rapidly from large fire to small fire, and which dispenses with movable parts, simplifies the construction, stabilizes its function, improves productivity, and achieves a cost reduction.

A gas burner for a stove according to this invention, comprises a nozzle, a mixing tube for producing a mixed gas by mixing a gas introduced in a jet from said nozzle and primary air drawn in with the introduction of the gas, flame holes, and a gas passage communicating said mixing tube to said flame holes, characterized by comprising a sub-chamber having an inlet for introducing said mixed gas from at least one of said mixing tube and said gas passage, and an outlet disposed adjacent said flame holes, and storing said mixed gas in a state of flux.

With the above construction of the gas burner for a stove, when the quantity of gas is reduced from large fire to small fire, an air-rich mixed gas is introduced into the sub-chamber to push a mixed gas having a mixing ratio for a large fire out of the outlet of the sub-chamber to the flame holes. Thus, the combustion occurring at the moment (for about 0.5 seconds) when the reduction to a small fire is made is maintained at certain flame holes. Subsequently, a normal mixed gas for the small fire is supplied to the mixing tube, and the fire spreads to the other flame holes to maintain a normal combustion of the small fire.

In this case, movable parts are dispensed with, the construction is simplified, assembly and productivity are improved, and a cost reduction is achieved. Having no movable parts stabilizes combustion.

In a mode for carrying out the invention, preferably, said inlet and said outlet are arranged such that a direction of introduction of said mixed gas introduced from said inlet into said sub-chamber is different from a direction extending from said inlet to said outlet. With this construction, an air-rich mixed gas in time of a reduction to a small fire never short-circuits to be supplied to the flame holes.

Preferably, a cross-sectional area of the inlet is made larger than a cross-sectional area of the outlet. With this construction the sub-chamber is never decompressed rapidly, to stabilize the flow to the outlet.

Other features and excellent functional advantages of this invention will be apparent from the following description and drawings of an embodiment of the invention.

BRIEF DESCRIPTION OF THE DRAWINGS

FIG. 1 (*b*) is a perspective view of the gas burner for a stove according to this invention with a burner cap removed therefrom;

FIG. 2 (*b*) is a perspective view of the back of a main burner body;

FIG. 3 (*b*) is a plan view of the mixing tube;

DETAILED DESCRIPTION OF THE PREFERRED EMBODIMENTS

Figure 1A:
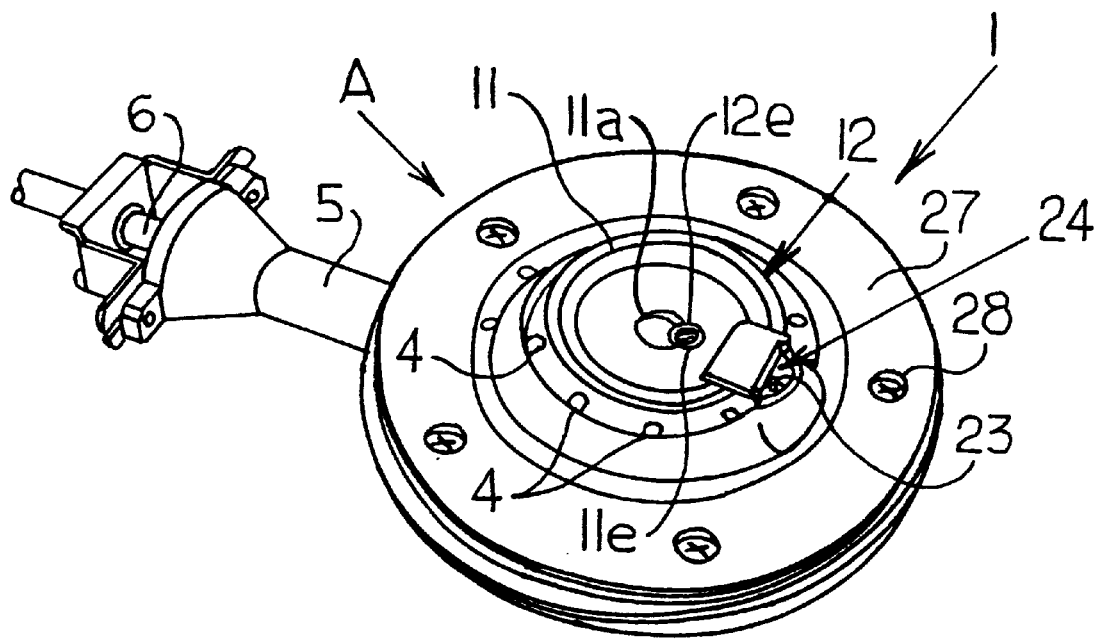
FIG. 1 (*a*) is a perspective view showing an entire gas burner for a stove in one embodiment of this invention.
Figure 1B:
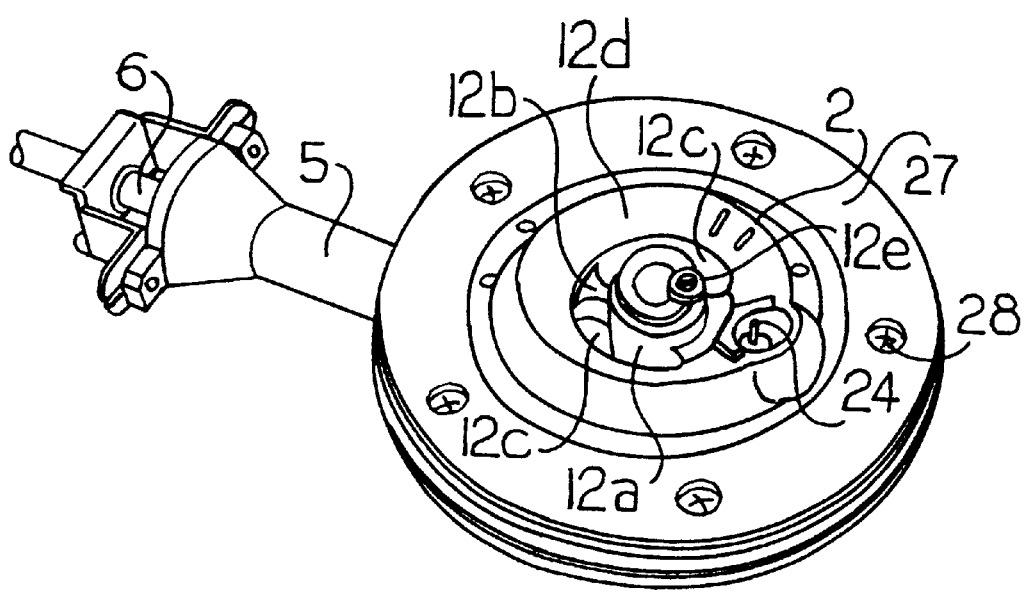
Figure 2A:
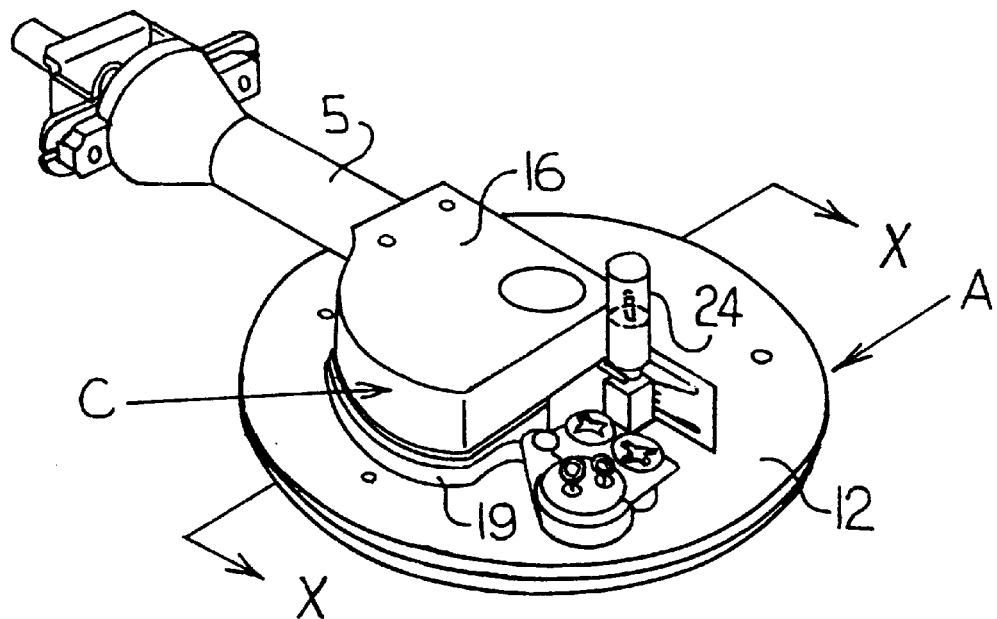
FIG. 2 (*a*) is a perspective view of the back of the entire gas burner for a stove shown in FIGS. 1 (*a*) and (*b*)
Figure 2B:
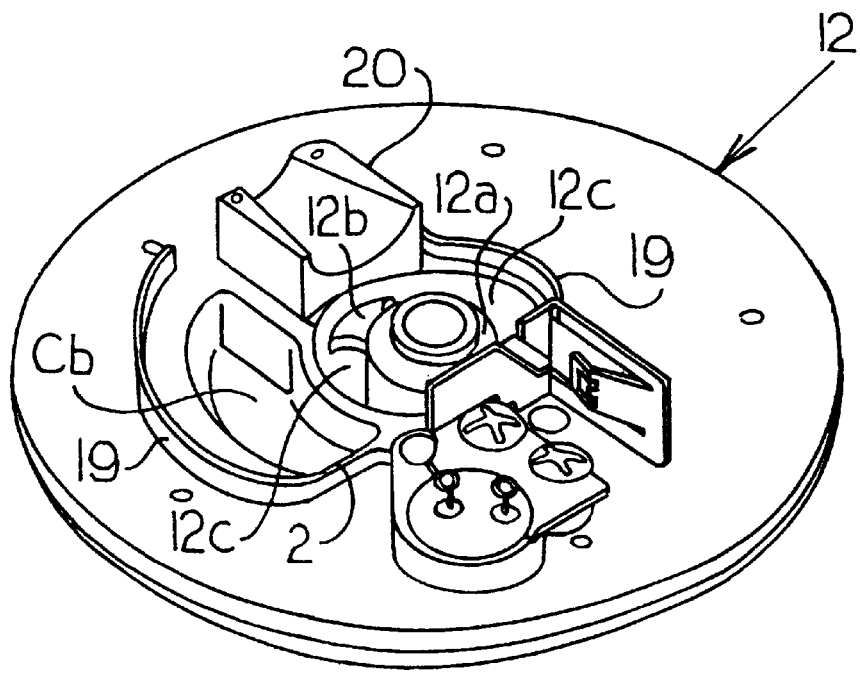
Figure 3A:
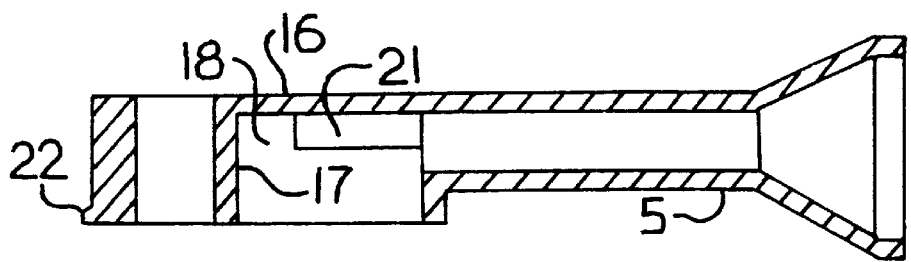
FIG. 3 (*a*) is a sectional view of a mixing tube.
Figure 3B:
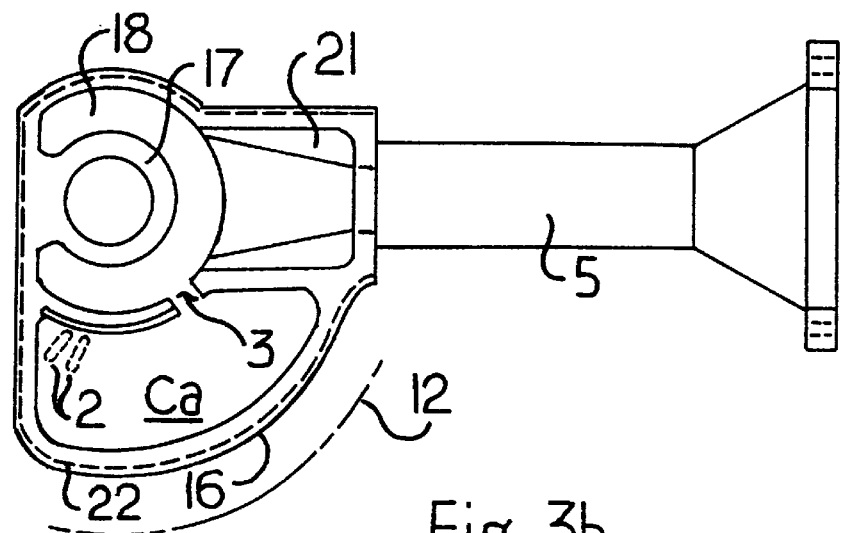

FIG. 1 (a) shows an overall perspective view of a gas burner A for a stove according to this invention, and FIG. 1 (b) shows a perspective view with a burner cap 11 removed. FIG. 2 (a) shows a perspective view of the back of gas burner A for a stove, and FIG. 2 (b) shows a perspective view of the back of a main burner body 12 with a mixing tube 5 removed. FIG. 3 (a) shows a sectional view of mixing tube 5, and FIG. 3 (b) a plan view of mixing tube 5. Though not shown in the drawings, this gas burner A for a stove is incorporated into a built-in stove or the like incorporated into a system kitchen.

Figure 4:
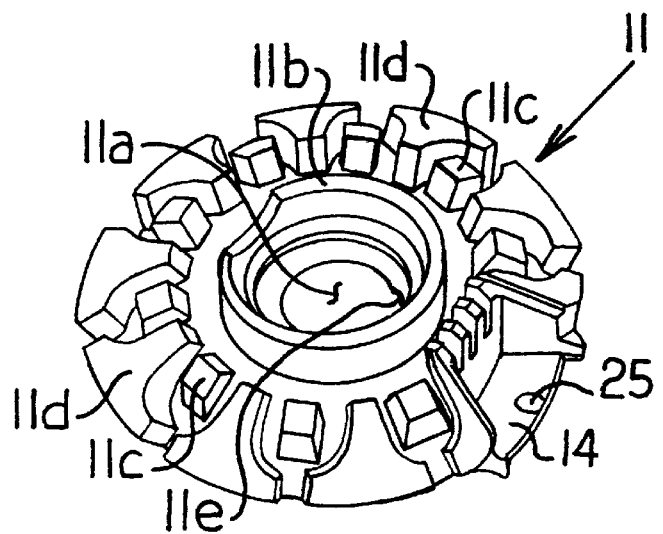
FIG. 4 is a perspective view of the back of the burner cap.

The gas burner A for a stove includes a gas burner 1 and a mixing tube 5. The gas burner 1 has a main burner body 12 and a burner cap 11. The mixing tube 5 is coupled to the main burner body 12 in a sealed manner. The various components such as the gas burner 1, mixing tube 5 and burner cap 11 are formed by aluminum-pressure die-casting. As shown in FIGS. 1 and 4, the burner cap 11, which is approximately umbrella-shaped, has a bore 11a formed centrally thereof for guiding secondary air, and an engaging cylinder 11b extending downward when the burner cap 11 is mounted on the main burner body 12. The burner cap 11 has, on the back thereof, inner circumferential partitions 11c and outer circumferential partitions 11d formed at intervals in the circumferential direction. Lower surfaces of inner circumferential partitions 11c and lower surfaces of outer circumferential partitions 11d are inclined to turn outward as they extend from the center toward the peripheries.

As shown in FIGS. 1 and 2, the main burner body 12 is approximately disc-shaped, and has an inner cylindrical element 12a formed centrally thereof and supported by a connector 12b. The inner cylindrical element 12a allows passage of secondary air through an interior space thereof A first gas passage 12c is formed circumferentially of the inner cylindrical element 12a. A mixed gas is supplied from the mixing tube 5 to the first gas passage 12c. Outwardly of the first gas passage 12c, a top surface of the main burner body 12 is inclined downward toward the center. The lower surfaces of inner circumferential partitions 11c and the lower surfaces of outer circumferential partitions lid of the burner cap 11 are placed on the inclined surface 12d. The mixed gas from the first gas passage 12c passes between the inner circumferential partitions 11c and outer circumferential partitions lid to be pushed out of flame holes 4 formed in peripheral positions between the main burner body 12 and burner cap 11. The mixed gas is ignited in an ignition chamber 14 formed in a part in the circumferential direction between the burner cap 11 and main burner body 12, to burn at the flame holes 4 distributed in the circumferential direction. The ignition chamber 14 includes an ignition device 23 having a spark plug 24 and a spark target 25.

The inner cylindrical element 12a of the main burner body 12 has a projection 12e formed on an upper surface thereof. On the other hand, the bore 11a of the burner cap 11 includes a small-diameter bore portion 11e formed therein. This small-diameter bore portion 11e is engaged with the projection 12e to position the burner cap 11 circumferentially relative to the main burner body 12. The mixing tube 5 has, disposed at one end thereof, a nozzle 6, and a damper for adjusting the intake quantity of primary air. The other end of mixing tube 5 has a case 16 with an open top formed integral therewith. The case 16 includes a cylindrical element 17 extending vertically therethrough. An approximately C-shaped second gas passage 18 is formed around the cylindrical element 17. The second gas passage 18 is vertically opposed to the first gas passage 12c of the main burner body 12. In the embodiment of the invention, the first gas passage 12c and second gas passage 18 are collectively called a gas passage. A lower sub-chamber Ca is formed radially outwardly of the first gas passage 12c of main burner body 12 through an inlet 3 in the form of a slit.

The main burner body 12 has a caulking edge 19 projecting in the form of a ridge from a lower surface thereof and fitting with an outer circumferential shape of case 16. An engaging projection 20 is formed also on the lower surface of main burner body 12 for positioning the case 16. However, the case 16 is rigidly connected to the main burner body 12 in a sealed manner by fitting an engaging recess 21 of the case 16 with the engaging projection 20, engaging the outer periphery of case 16 inside the caulking edge 19 in the form of a ridge to envelop a projection 22 (flange) formed on an outer surface at the opening side of case 16, and deforming the caulking edge 19. The inner cylindrical element 12a of main burner body 12 also has a caulking edge 12f formed on an inner, lower surface thereof. The caulking edge 12f is deformable to establish a sealed connection with the cylindrical element 17 of the case 16.

As in the prior art construction, the nozzle 6 is provided for said mixing tube 5. Gas is introduced in jet from the nozzle 6. With the introduction of gas, primary air is drawn into the mixing tube 5 by way of the damper (not shown) for varying the area of a primary air intake port to change the quantity of primary air drawn in. The gas and primary air are mixed in the mixing tube 5. This mixed gas passes from the mixing tube 5 through the case 16, and through the first gas passage 12c in the main burner body 12, to the lower surface of burner cap 11 to be spouted from the flame holes 4 while being ignited by said ignition device 23 in the ignition chamber 14 to burn.

Incidentally, as shown in FIG. 2 (b), the main burner body 12 has a recessed upper sub-chamber Cb opposed to the lower sub-chamber Ca of the case 16. The vertically opposed upper and lower sub-chambers Ca, Cb constitute a sub-chamber C. An outlet 2 in the form of two slits is opened, in an inward position of the upper sub-chamber Cb, in the inclined surface 12d of the main burner body 12 opposed to the burner cap. In this way, the sub-chamber C having the inlet 3 for introducing the mixed gas of gas and primary air from the mixing tube 5, and the outlet 2 for letting out the mixed gas, is formed integral with the gas burner 1, and the outlet 2 is formed adjacent the flame holes 4 of the gas burner 1. As seen from FIG. 3, the sub-chamber C is formed as a hollow chamber disposed arcuately and radially outwardly of the first gas passage 12c and second gas passage 18 with respect to the center of the gas burner 1 which is approximately circular In this embodiment, the sub-chamber C communicates with the first gas passage 12c only through one inlet 3.

With the above construction, when the quantity of gas is reduced from large fire to small fire by operating a knob on a control panel on the front of the gas stove and operating an appliance valve, an air-rich mixed gas is introduced into the sub-chamber C by the inertia of the primary air so far drawn in in a large quantity. Since a mixed gas having a mixing ratio for a large fire is stored in a state of flux in the sub-chamber C, the mixed gas having such a normal mixing ratio is pushed out of the outlet 2 of the sub-chamber C to the flame holes 4. Thus, the combustion occurring at the moment (for about 0.5 seconds) when the reduction to a small fire is made is maintained at the flame holes 4 adjacent the outlet 2. Subsequently, a normal mixed gas for a small fire is supplied to the mixing tube 5, and the fire spreads to the other flame holes 4 to maintain a normal combustion of small fire.

In this case, as shown in FIG. 3 (b), the mixed gas supplied from the mixing tube 5 collides with the cylindrical element 17 of the case 16, to have the strength of flow diminished. The gas is introduced through the inlet 3 in slit form, the inlet 3 having a direction of introduction set such that the mixed gas introduced does not flow directly toward the outlet 2. That is, said inlet 3 and said outlet 2 are arranged such that the direction of introduction of said mixed gas introduced from said inlet 3 into said sub-chamber C is different from a direction extending from said inlet 3 to said outlet.

Thus, the air-rich mixed gas in time of the reduction to a small fire takes a roundabout way to the outlet 2, without being supplied to the inlet 3 to short-circuit to the flame holes 4, to back up effectively the preceding mixed gas having the mixing ratio for the state of large fire. The mixed gas having the mixing ratio for the state of large fire is delivered through the outlet 2.

Figure 5:
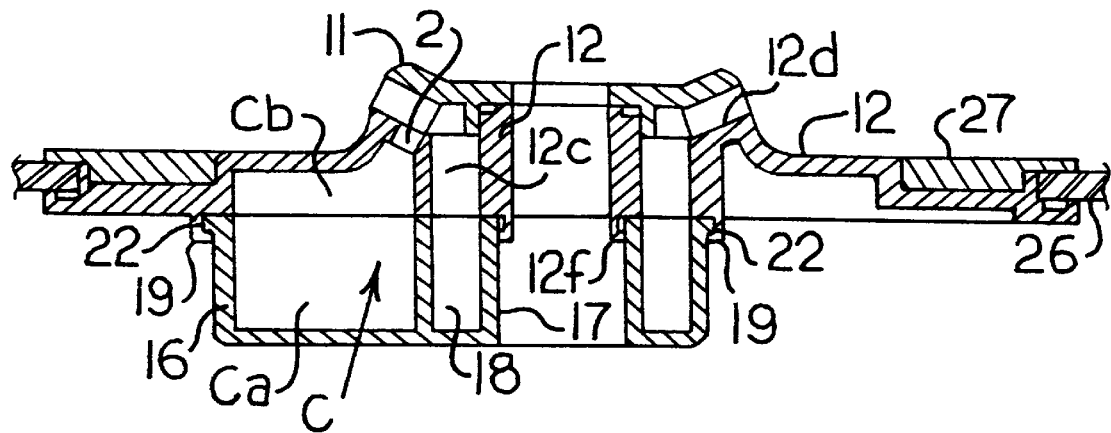
FIG. 5 is a sectional view taken on line X—X of FIG. 2 (a)
Figure 6:
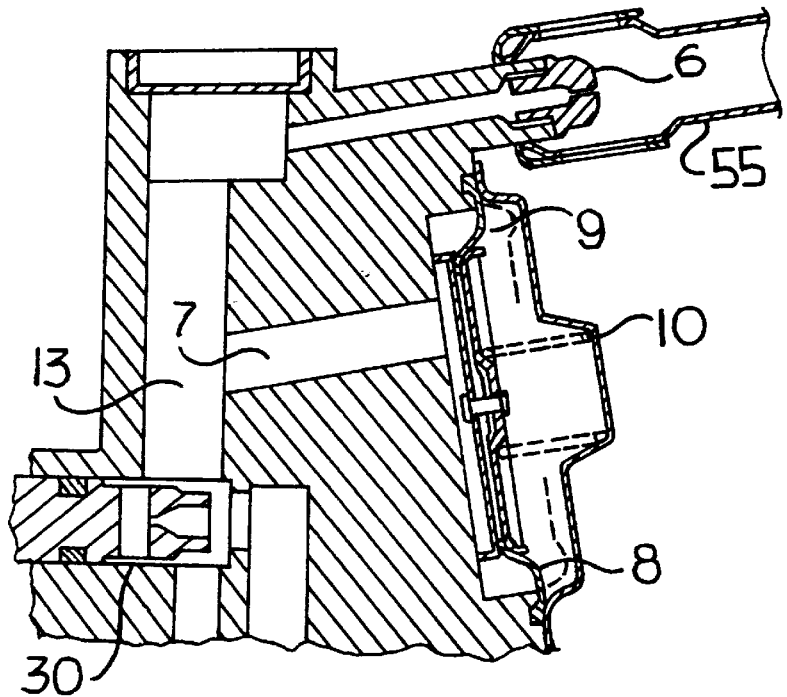
FIG. 6 is a sectional view of a gas burner for a stove according to the prior art.

Moreover, the inlet 3 has a cross-sectional area larger than the cross-sectional area of outlet 2, so that the mixed gas flow out of the outlet 2 steadily. As shown in FIGS. 1 and 5, a top board 26 formed of glass is supported between an outer edge of main burner body 12 and an annular presser ring 27. The top board 26 is fixed in place by attaching the presser ring 27 to the main burner body 12 with screws 28.

With this gas burner A for a stove, even where a storage with an open/close door is provided in a lower portion of the built-in stove, and the supply of primary air from the damper is obstructed by a negative pressure occurring when the open/close door is opened, a mixed gas having a normal mixing ratio is stored in the sub-chamber C, and is supplied continuously, so that a fire does not go out inadvertently.

As described above, the gas burner for a stove according to the invention in this application includes a sub-chamber having an inlet for introducing said mixed gas from at least one of said mixing tube and said gas passage, and an outlet disposed adjacent said flame holes, and storing said mixed gas in a state of flux. Thus, when the quantity of gas is reduced from large fire to small fire, the mixing tube receives an air-rich mixed gas having a small quantity of gas and primary air introduced in a large quantity by inertia. Such an air-rich mixed gas is introduced into the sub-chamber to push a mixed gas stored in the sub-chamber and having a mixing ratio for a large fire, out of the outlet of the sub-chamber to the flame holes. The combustion occurring at the moment (for about 0.5 seconds) when the reduction to a small fire is made is maintained at certain flame holes by the mixed gas having a mixing ratio for a large fire. Subsequently a normal mixed gas having a small quantity of primary air corresponding to the reduction in the quantity of gas for producing a small fire is supplied to the mixing tube 5, and the fire spreads to the other flame holes, to maintain a normal combustion of small fire. This provides the advantage of avoiding an inadvertent stoppage of combustion due to an air-rich mixed gas supplied to all the flame holes as in the case of the prior art.

Moreover, the sub-chamber is formed integral with the gas burner, to dispense with the movable parts used conventionally, simplify the construction, improve assembly and productivity, and achieve a cost reduction. Having no movable parts provides an advantage of stabilizing combustion.

As shown in the embodiment described above, said inlet and said outlet are arranged such that the direction of introduction of a mixed gas introduced from the inlet into the sub-chamber is different from the direction extending from the inlet to the outlet. Then, an air-rich mixed gas in time of a reduction to a small fire takes a roundabout way in the sub-chamber to the outlet, without being supplied to the inlet to short-circuit to the flame holes. This provides an advantage of fulfilling the object of this invention with increased effect.

In addition, where the cross-sectional area of the inlet is larger than the cross-sectional area of the outlet, the sub-chamber is never decompressed rapidly, which provides an advantage of stabilizing the flow to the outlet.

In the best mode for carrying out the above invention, the inlet 3 of sub-chamber C communicates only with the gas passage C. However, it is a matter of design conceivable to a person skilled in the art to connect the inlet 3 to the mixing tube 5, which falls within the scope of this invention.

What is claimed is:

1. A gas burner for a stove comprising a nozzle, a mixing tube for producing a mixed gas by mixing a gas introduced in a jet from said nozzle and primary air drawn in with the introduction of the gas, flame holes formed between a main burner body communicating with said mixing tube and a burner cap disposed on said main burner body, and a gas passage communicating said mixing tube to said flame holes, said gas burner for a stove having a sub-chamber formed in said main burner body, having an inlet for introducing said mixed gas from at least one of said mixing tube and said gas passage, and an outlet formed in a surface of said main burner body opposed to said burner cap, and storing said mixed gas in a state of flux.

2. A gas burner for a stove as defined in claim 1, wherein said inlet and said outlet are arranged such that a direction of introduction of said mixed gas introduced from said inlet into said sub-chamber is different from a direction extending from said inlet to said outlet.

3. A gas burner for a stove as defined in claim 1, wherein a cross-sectional area of the inlet is larger than a cross-sectional area of the outlet.

4. A gas burner for a stove as defined in claim 1, wherein said gas burner is approximately circular, said sub-chamber being disposed outwardly of said gas passage with respect to the center of said circle.

5. A gas burner for a stove as defined in claim 1, wherein said inlet communicates with said gas passage, said sub-chamber communicating with said gas passage only through said inlet.

6. A gas burner for a stove as defined in claim 1, wherein said main burner body is formed by aluminum-pressure die-casting.

\* \* \* \* \*